(12) United States Patent
Briquet-Kerestedjian et al.

(10) Patent No.: US 10,420,279 B2
(45) Date of Patent: Sep. 24, 2019

(54) SYSTEM AND METHOD FOR THE AUTOMATIC ADJUSTMENT OF AN AGRICULTURAL IMPLEMENT USING A MEASURING LIGHT SCREEN

(71) Applicant: COMMISSARIAT A L'ENERGIE ATOMIQUE ET AUX ENERGIES ALTERNATIVES, Paris (FR)

(72) Inventors: Nolwenn Briquet-Kerestedjian, Paris (FR); Frederic Colledani, Massy (FR); Baptiste Lelong, Les Martres de Veyre (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 214 days.

(21) Appl. No.: 15/531,541

(22) PCT Filed: Dec. 2, 2015

(86) PCT No.: PCT/EP2015/078383
§ 371 (c)(1),
(2) Date: May 30, 2017

(87) PCT Pub. No.: WO2016/087526
PCT Pub. Date: Jun. 9, 2016

(65) Prior Publication Data
US 2017/0303470 A1 Oct. 26, 2017

(30) Foreign Application Priority Data
Dec. 5, 2014 (FR) .................................... 14 62002

(51) Int. Cl.
*A01B 63/10* (2006.01)
*A01D 41/14* (2006.01)
(Continued)

(52) U.S. Cl.
CPC ............ *A01D 41/141* (2013.01); *A01B 63/10* (2013.01); *A01D 41/127* (2013.01); *A01D 47/00* (2013.01); *A01D 45/021* (2013.01)

(58) Field of Classification Search
CPC ....... A01B 63/02; A01B 63/10; A01B 63/008; A01D 47/00; A01D 75/00; A01D 41/141;
(Continued)

(56) References Cited

U.S. PATENT DOCUMENTS 4,197,691 A 4/1980 Woodruff
4,507,910 A 4/1985 Thornley et al.
(Continued)

FOREIGN PATENT DOCUMENTS

AU 5387473 A 10/1974

OTHER PUBLICATIONS

International Search Report dated Feb. 19, 2016 in PCT/EP2015/078383 filed Dec. 2, 2015.
(Continued)

*Primary Examiner* — Robert E Pezzuto
(74) *Attorney, Agent, or Firm* — Oblon, McClelland, Maier & Neustadt, L.L.P.

(57) ABSTRACT

The invention relates to a system for adjusting the height of an agricultural implement, including an arm that can be controlled so as to raise and lower the implement; a height measuring sensor mounted on the arm and positioned in front of the implement in the direction of travel of the vehicle equipped with the arm. A calculator configured to provide a control set point for the height of the arm on the basis of the measurements obtained by the sensor, wherein the sensor is a light screen device formed by an emitter in the form of a column of light sources and a receiver in the form of a column of photoreceptors. The emitter and the receiver are mounted on the arm facing one another and extending
(Continued)

along their longitudinal axis, perpendicularly to the ground, in order to measure the height of plants located therebetween.

11 Claims, 2 Drawing Sheets

(51) Int. Cl.
*A01D 47/00* (2006.01)
*A01D 41/127* (2006.01)
*A01D 45/02* (2006.01)

(58) Field of Classification Search
CPC .... A01D 41/127; A01D 34/03; A01D 34/008; A01D 45/021; B60R 1/00
USPC .............. 56/10.2 E, 10.2 R, 15.8, 15.9, 17.1; 701/50
See application file for complete search history.

(56) References Cited

U.S. PATENT DOCUMENTS

| | | | | |
|---|---|---|---|---|
| 5,742,069 | A * | 4/1998 | Steenwyk | G01B 11/26 250/559.29 |
| 8,381,502 | B2 | 2/2013 | Dunn | |
| 10,172,289 | B2 * | 1/2019 | Briquet-Kerestedjian | ................... A01B 63/10 |
| 2001/0045534 | A1 * | 11/2001 | Kimura | E02F 3/847 250/559.38 |
| 2013/0345937 | A1 | 12/2013 | Strelioff et al. | |
| 2014/0236381 | A1 | 8/2014 | Anderson et al. | |
| 2015/0195991 | A1 * | 7/2015 | Ricketts | A01D 41/141 56/249 |

OTHER PUBLICATIONS

French Search Report dated Jul. 10, 2015 in FR 1462002 filed Dec. 5, 2014.

* cited by examiner

SYSTEM AND METHOD FOR THE AUTOMATIC ADJUSTMENT OF AN AGRICULTURAL IMPLEMENT USING A MEASURING LIGHT SCREEN

TECHNICAL FIELD

The field of the invention is that of agricultural robotic systems. The invention aims more particularly a system making it possible to automatically adjust the position of an agricultural implement, such as an implement for cutting or tearing plants. In particular it has application in the automating of the mechanical castration operations of fields of corn seed.

PRIOR ART

Corn is a self-pollinating plant that is substantially subjected to the effect of heterosis, i.e. to the improvement of the capacities and of the vigour of the plant in hybrid or heterozygous form in relation to the plant in homozygous form. Breeders therefore seek to cross two homozygous producing lines in order to obtain a hybrid variety that is more productive and more vigorous and provided with interesting agronomic characteristics.

The corn plant is monoic, comprised of one male inflorescence, called a panicle which is located at the top of the plant and is responsible for the emission of pollen, and of one female inflorescence located at mid-height of the plant, at the base of a leaf. This inflorescence is comprised of stigmas or receptive silks which are fertilised by the pollen, and lead to the formation of the ear. The production of hybrid seeds is carried out by cultivating in the same plot, generally on interspersed lines, plants of the two parent lines of the hybrid. The panicle of the productive female line is topped before flowering so that these plants are fertilised by the pollen of the male productive line. The ears harvested on this productive female line as such carry the hybrid seeds that will be marketed. The production of hybrids is not limited to the obtaining of simple hybrids coming from the crossing of two lines of corn, it can consist in the crossing of a hybrid and of a line (three-channel hybrid) or in the crossing of two hybrids (double hybrid).

Topping the male panicle on the productive females before flowering is as such an essential step in the process of the production of hybrid corn seed. Indeed, the presence of pollen, even in small quantities, results in self-fertilisations on these productive females and a contamination in the production of hybrids. This topping was conventionally carried out manually. As the labour costs generated by this step are substantial, it was sought to mechanise this step with various implements, including blades intended to cut the canopy of the plants and rollers intended for the panicle or the cone.

The process of mechanical castration can be carried out either with one or several passes of blades only, or in two steps. In a first step, a pass with blades is carried out on the productive female rows: rotating blades cut the top of the male plant. The ideal cutting height is located at three-quarters of the cone, i.e. the leaf surrounding the panicle, from its canopy or at three-quarters of the panicle if the latter exceeds the cone. Between two and five days later, when the panicle has grown somewhat (2 to 5 cm) but before it is open enough to emit pollen, a tearing out with rollers or with tyres is carried out. The objective is to catch the panicle with the rollers or the tyres by tearing as least as possible the cone or the leaves that would still be around it. For this, the rollers have to be placed at the base of the panicle while still remaining above the leaves. The purpose of the first cut is to clear the row so that afterwards the panicle extends beyond the foliage which has remained relatively straight since the panicle grows faster than the leaves. The objective of the second cut is to tear the rest of the panicle and as such eliminate any risk of self-reproduction.

During these operations, the farmer visually evaluates the optimum cutting height of the panicle, from the nacelle of his machine and actuates a control lever that governs the height of the cutting and tearing implements. Generally, two rows are cut simultaneously at the same height which makes it possible to save time but risks penalising the cutting of one of the two rows if the plants are not of a homogeneous size. The quality of the cutting is therefore limited by the reactivity of the driver but also by the precision that the current architecture of the machine provides. Consequently, many panicles are not cut at the correct height. At the end of the two steps of mechanical cutting, only 70 to 80% of the panicles are eliminated.

It is then necessary to supplement this step with a step of manual castrating the remaining panicles, and the remaining parts of the cut panicles when the cutting has not allowed for the complete elimination of the panicle, in order to respect the standards defined by GNIS (Groupement National Interprofessionnel des Semences et plants) pertaining to the rate of purity to be complied with for the production of corn seed. Every summer and for a few weeks, farmers hire several dozen workers in order to carry out this tedious and arduous work.

It is therefore sought to carry out these operations of mechanical castrating in an automated manner in order to improve the output of it, reduce the costs of it and to reduce the arduousness of it.

In all of the mechanical castrating systems currently available, the eliminating of the panicle is inseparable from the eliminating of the leaves in particular the leaves of the cone. This eliminating of plant material penalises the plant in its future development and affects the final output of the crop. Improving mechanical castrating systems is therefore a genuine stake in agricultural machinery, with the goal being to optimise the tearing of the panicle while still minimising the elimination of vegetation.

Several approaches propose a solution for automatically adjusting the cutting height with a measurement sensor that is proper to each row.

The system proposed by the U.S. Pat. No. 4,197,691 uses a measurement sensor comprised of juxtaposed vertical rods mounted on a pivoting shaft that is more or less in contact with the leaves which triggers the sending of a signal to raise or lower. However, this sensor system via contact requires a permanent adjustment of the cutting height. In addition, two rows are always cut simultaneously at a common height.

Other approaches propose sensors for measuring distances seen from above, such as for the system proposed by U.S. Pat. No. 4,507,910 that studies the measurement and the control of heights during a harvest by a harvester. The sensor used is an ultrasound sensor located upstream of the threshing wheel. It is placed above harvests and measures the relative distance between the harvests and the sensor. Then a signal is sent in order to adjust the height of the threshing wheel with respect to the height desired for the harvest.

The model proposed by U.S. Pat. No. 8,381,502 is similar to the preceding system but is adapted for a corn castrating agricultural machine. Photocells placed upstream above the stalks of corn locate the top of the leaves of two rows at a time, then send a signal to raise or lower in order to cut the two rows at a common height. Due to the differences in heights, the roughness of the ground and the speed of the vehicle, the system constantly tries to adjust the set point in order to maintain a uniform cutting height.

Moreover a system proposed by SARL Duissard is known which is based on two sets of emitting/receiving photoelectric cells placed upstream of the cutting implements and located 13 cm one under the other, on either side of the two rows. These cells operate via direct detection: an infrared beam is emitted by the photoelectric cell while a reflector, located opposite, reflects the beam to the cell that receives it. If there is corn on the path of the beam, then the latter will not be received by the photoelectric cell. The maximum height is detected when the lower cell sees corn (beam obstructed by the corn therefore not perceived by the lower cell) and that the upper cell does not see any (beam perceived by the upper cell), with the precision that the distance between the two photocells is 13 cm. As such, when the two cells see corn (the two beams are obstructed) then the cutting height is too low and a cylinder is extended so that the arm carrying the cutting implements rises. On the contrary, when neither of the two cells sees corn (the two beams are received by the cells) then the cutting height is too high and the rod of the cylinder retracts so that the arm is lowered. The installation of a timer is required in order to retain the set point for several seconds as the time for detecting and for sending the set point are too short with respect to the time required for the displacement of the arm.

This system as such sends an "all or nothing" set point to the actuator (raise or lower) due to the presence of only two photocells. The system therefore constantly tries to adjust the cutting height with repeated and sometimes contrary set points which solicits it substantially.

Moreover as soon as the cells see a void, for example between two stalks of corn, the entire arm will be lowered and have to immediately be raised again at the level of the next stalk. Likewise, at the end of a row the entire system will be lowered and probably miss the first stalks of the following row.

The degree of precision is moreover limited by the vertical spacing between the two sets of photocells, which is 13 cm. The cells furthermore process the information for two rows simultaneously therefore the stalk of corn of the lower row will be cut too high. Finally, the overall encumbrance of the system remains a problem for farmers.

Exposure of the Invention

The invention aims to improve the existing systems for automating the cutting or tearing operations of plants, and in order to do this proposes a system for adjusting the height of an agricultural implement, comprising an arm that can be controlled so as to raise and lower the agricultural implement, a height measuring sensor mounted on the arm and positioned in front of the agricultural implement in a direction of travel of a vehicle intended to be equipped with the arm, and a calculator configured to provide a control set point for the height of the arm on the basis of the measurements obtained by the height measuring sensor, characterised in that the height measuring sensor is a light screen device formed by an emitter in the form of a column of light sources and a receiver in the form of a column of photoreceptors, the emitter and the receiver being mounted on the arm facing one another and extending along their longitudinal axis, perpendicularly to the ground in order to make it possible to measure the height of plants located therebetween.

Some preferred but not limiting aspects of this system are as follows:
- the height measuring sensor is configured to carry out a straight sweep according to which all of the beams between a light source and a photoreceptor facing each other are scanned in turn from the beam that is closest to the ground and in order to provide a relative indication to the last beam blocked;
- it further comprises a memory in which the measurements made by the height measuring sensor are recorded, and the calculator is configured to provide the control set point for the height of the arm based on measurements previously recorded in the memory and corresponding to the prior displacement of the height measuring sensor over a predetermined distance of the direction of travel upstream of the current position of the cutting implement;
- it further comprises a measurement sensor of the forward speed in the direction of travel of the vehicle, and the computer is furthermore configured to determine the distance travelled along the direction of travel between two measurements taken successively by the height measuring sensor;
- the calculator is configured to provide the control set point for the height of the arm using the average of the measurements previously taken by the height measuring sensor over said predetermined distance;
- the calculator is configured to provide the control set point for the height of the arm using the maxima of the measurements taken previously by the height measuring sensor over said predetermined distance;
- the calculator is configured to calculate a foliage density that indicates, for each height interval of a set of successive intervals, the percentage of measurements among the measurements previously taken by the height measuring sensor over said predetermined distance which indicate a height greater than the lower limit of the height interval, and to provide the control set point for the height of the arm on the basis of the lower limit of a height interval corresponding to a threshold percentage.

BRIEF DESCRIPTION OF THE DRAWINGS

Other aspects, purposes, advantages and characteristics of the invention shall appear better when reading the following detailed description of preferred embodiments of the latter, given by way of a non-limiting example, and given in reference to the annexed drawings wherein.

DETAILED DESCRIPTION OF PARTICULAR EMBODIMENTS

The invention relates to a system for adjusting the height of an agricultural implement. It applies in general to any field where a measurement and an adjustment of the height are required, in particular for implements for cutting or tearing plants such as those used for the castration of corn or for the grain harvest.

Figure 1:
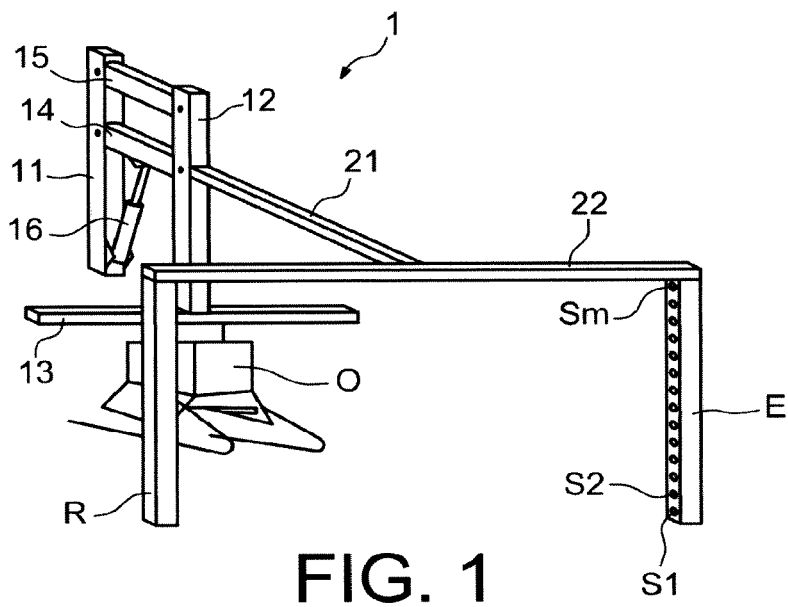
FIG. 1 is a perspective diagrammatical view of a system according to a possible embodiment of the invention.
Figure 2:
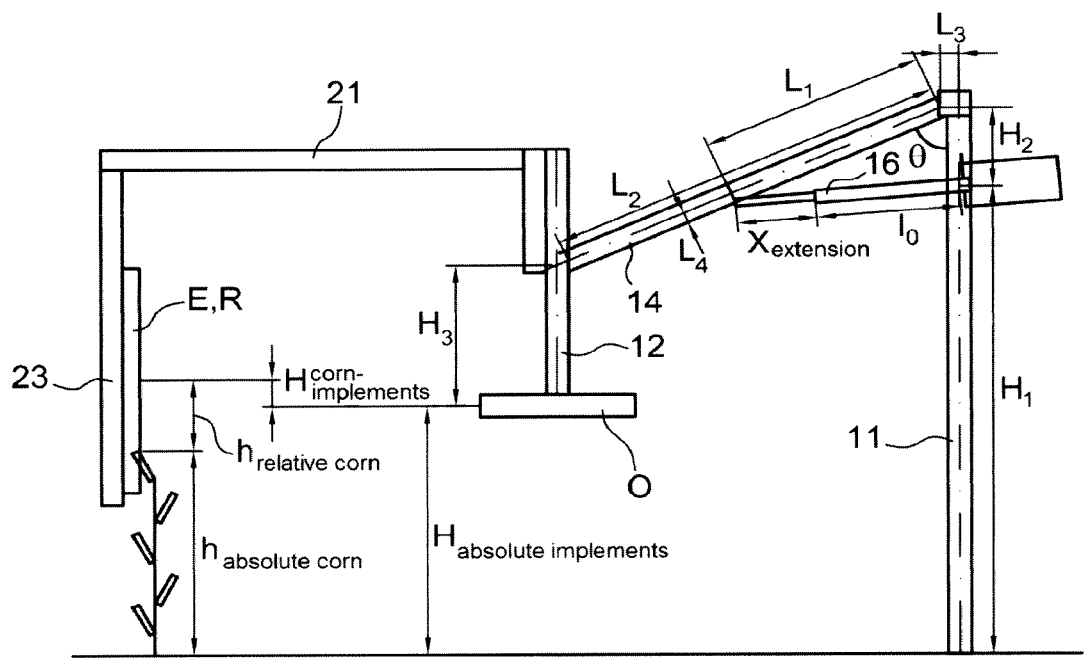
FIG. 2 is a diagram of a simplified model of the arm carrying the agricultural implement and the height measuring sensor.

In reference to FIGS. 1 and 2, the invention relates to a system for adjusting the height of an agricultural implement O. This system is formed of an arm 1 that can be controlled so as to raise and lower the agricultural implement, of a height measuring sensor E, R mounted on the arm and positioned in front of the agricultural implement O in a direction of travel of a vehicle intended to be equipped with the arm, and a calculator configured to provide a control set point for the height of the arm on the basis of the measurements obtained by the height measuring sensor.

The agricultural implement is typically a cutting implement (for example a cutting implement with blades) or a tearing implement (for example with tyres or with rollers) of plants. Such an implement generally comprises a cutting or tearing instrument (blades, tyres or rollers), a motor for driving the instrument, a vegetation guide and a protective cover.

For the castration of corn, the vehicle used is a high-clearance tractor which makes it possible to pass over the productive male rows which will not be cut or torn and to cut or fear several female productive rows at the same time. A conventional high-clearance tractor generally comprises two or four arms upstream of the vehicle, with each arm carrying two cutting or tearing implements so as to simultaneously cut two rows at the same height, which makes it possible to save time but risks penalising the cutting of one or of both rows. In a possible embodiment of the invention, only one cutting or tearing implement per arm will be used in order to individualise the cutting per row of crop.

Returning to FIGS. 1 and 2, the arm 1 comprises a rear vertical post 11 that forms the main structural connection with the agricultural vehicle, and a front vertical post 12 that carries at its lower end a horizontal bar for the support of the agricultural implement 13 which extends perpendicularly to the direction of travel and whereon is mounted the agricultural implement O. In an alternative embodiment, the arm can carry several agricultural implements, two typically, for the carrying out of simultaneous operations on several rows of crop.

The vertical posts 11 and 12 are connected together by connecting posts 14 and 15 are mounted so as to pivot in relation to the rear vertical post 11. A cylinder 16 is mounted between the rear vertical post 11 and the connecting post 14, and provides a means for adjusting the height of the connecting post 14, and through this the height of the front vertical post 12 and of the cutting implement O, by pivoting of the connecting post 14 with respect to the rear vertical post 11.

The arm 1 comprises moreover a support for the height measuring sensor comprised of a horizontal post 21 mounted on the front vertical post 12 in order to extend frontwards in the direction of travel of the vehicle in such a way as to be in front of the agricultural implement O supported by the front vertical post 12. The front end of the horizontal post 21 carries a horizontal bar for supporting the height measuring sensor 22 which extends perpendicularly to the direction of travel.

The height measuring sensor is a light screen device formed by an emitter E in the form of a column of light sources S1, S2, . . . , Sm, and a receiver R in the form of a column of photoreceptors. The emitter E and the receiver R are mounted on the arm 1 facing one another and extending along the longitudinal axis thereof, perpendicularly to the ground in order to make it possible to measure the height of plants located therebetween. Each emitter is as such able to emit a beam, for example in the infrared range, in the direction of the photoreceptor which is facing it.

The emitter E and the receiver R are each carried by the horizontal bar for supporting the height measuring sensor 22, for example at each one of its ends. This horizontal bar 22 can support, for example at each one of its ends, a vertical element 23 able to make it possible to allow for the mounting of the emitter E or of the receiver R. The horizontal bar 22 is more preferably sized in order to allow for the measuring of the height of a single row of crop between the emitter and the receiver of the height measuring sensor.

Having recourse to an emitter E in the form of a column of light sources S1, S2, . . . , Sm, and a receiver R in the form of a column of light receivers makes it possible to multiply the sensors upstream of the agricultural implement which authorises the elaboration of a set point for raising or for lowering the arm that is not "all or nothing" but on the contrary quantified.

An example of a height measuring sensor that can be used in the framework of the invention is a measuring light screen A-GAGE™ EZ-ARRAY™ proposed by the company Turck Banner. It is possible in particular to choose a sensor of which the screen height is 600 mm with a resolution of 5 mm, with the scanning taking place from bottom to top in 9.3 ms.

Note that this sensor has the advantage of not being disturbed by exposure to the sun and the vibrations of the machine. Optionally, a compressed air stream device is associated with it in order to remove the dust or drops that may have settled on the sensor.

This sensor has the advantage of proposing several measuring modes, in order to provide different indications such as the first beam obstructed, the last beam established, the total number of beams obstructed, etc. The mode that detects the last beam obstructed can be favoured since it makes it possible to obtain the profile of the plant by locating the maximum height of the plant using the light screen. As such, in an embodiment of the invention, the height measuring sensor is configured to carry out a straight sweep according to which all of the beams between a light source and a photoreceptor facing each other are scanned in turn from the beam that is the closest to the ground, and in order to provide a relative indication to the latest beam blocked.

A simplified model of the arm with the implement or implements O and the height measuring sensor E, R upstream in the direction of travel is proposed in FIG. 2. The acquisitions are carried out for example every millisecond. On the other hand, the set point is calculated for example every 100 ms, using a certain number of acquisitions preceding the calculation. A variator coupled to a motor can be used to control in voltage the extension of the cylinder 16, here electric. The tension sent to the variator is connected to the motor angular position by the relationship:

$$\theta_{motor} = \frac{1}{U_{max\ variator}} \left( 360 \frac{C_{cylinder}}{p} \right) U_{variator} \quad (1)$$

With $U_{max}$ variator the maximum voltage that can be sent to the variator (10V for example), $C_{cylinder}$ the course of the electric cylinder (300 mm for example) and p the pitch of the screw of the motor (10 mm/rev for example). The invention extends however to other types of cylinders, in particular to hydraulic cylinders.

During an acquisition, the extension of the cylinder 16 is recovered thanks to an angular position sensor, for example a resolver, then it is necessary to find the absolute height $h_{absolute\ implements}$ of the implement O by geometry in order to deduce therefrom the absolute height $h_{absolute\ corn}$ of the corn. During the calculation loop of the set point, the absolute heights of the corn can be processed according to different strategies, of which examples shall be presented hereinafter, in order to obtain the set point for the cutting height, i.e. the set point for the absolute height of the implements. The latter is then converted into a cylinder extension, then into voltage which is sent to the variator.

The objective is therefore to first know the relationship between the extension of the cylinder and the absolute height of the implements as well as that between the absolute height of the implements and the absolute height of the corn, in order to be able to apply the various strategies to the absolute heights of the corn. The position sensor of the motor makes it possible to know the number of increments $n_{increments}$ of the motor that controls the cylinder 16 which is to be converted into a motor position $\theta_{motor}$ then into a cylinder extension $x_{extension}$ thanks to the formulas:

$$\theta_{motor} = \frac{2\pi}{2m} n_{increments} - \theta_{motor\ initial} \tag{2}$$

$$x_{extension} = \frac{p}{2\pi} \theta_{motor} \tag{3}$$

With in the increment unit (20 for the motor used), p the screw pitch (10 mm/rev for the cylinder used) and $\theta_{motor\ initial}$ the initial position of the motor.

In order to calculate $h_{absolute\ implements}$ according to $x_{extension}$, the angle $\theta$ is used, shown in FIG. 2, between the rear vertical post 11 and the connecting post 14. By geometry, the following relationship is obtained:

$$(l_0 + x_{extension})^2 = \tag{4}$$
$$L_1^2 + L_3^2 + L_4^2 + H_2^2 + 2\sin\theta(L_1 L_3 - L_4 H_2) - 2\cos\theta(L_1 H_2 + L_3 L_4)$$

Giving $$(l_0 + x_{extension})^2 = \tag{5}$$
$$L_1^2 + L_3^2 + L_4^2 + H_2^2 + 2\sin(\theta - \alpha)\sqrt{(L_1 L_3 - L_4 H_2)^2 - (L_1 H_2 + L_3 L_4)}$$

With $$\alpha = \operatorname{atan}\left(\frac{\sin\alpha}{\cos\alpha}\right) = \operatorname{atan}\left(\frac{2(L_1 H_2 + L_3 L_4)}{2(L_1 L_3 - L_4 H_2)}\right)$$

Therefore:

$$\theta = \operatorname{asin}\left(\frac{(l_0 + x_{extension})^2 - L_1^2 - L_3^2 - L_4^2 - H_2^2}{2\sqrt{(L_1 L_3 - L_4 H_2)^2 - (L_1 H_2 + L_3 L_4)}}\right) + \operatorname{atan}\left(\frac{L_1 H_2 + L_3 L_4}{L_1 L_3 - L_4 H_2}\right) \tag{6}$$

In addition, we have:

$$\cos\theta = \frac{H_1 + H_2 - H_3 - h_{absolute\ implements}}{L_2} \tag{7}$$

The following is therefore obtained:

$$h_{absolute\ implements} = H_1 + H_2 - H_3 - L_2 \cos\theta \tag{8}$$

Finally, the following relationship can be defined:

$$h_{absolute\ corn} = h_{absolute\ implements} + H_{corn-implements} + h_{relative\ corn} \tag{9}$$

Knowing that $h_{relative\ corn}$ is the relative height of the corn in relation to the middle of the height measuring sensor (value between −300 mm and +300 mm for a screen of height $L_{barrier}$=600 mm). Indeed, the height measuring sensor returns a voltage $U_{barrier}$ between $U_{barrier\ empty}$, the voltage of the detector empty, and $U_{max\ barrier}$, the maximum voltage of the detector (10V for the detector used), proportional to the height of the last beam obstructed by the corn using the formula (10):

$$h_{relative\ corn} = \frac{L_{barrier}}{U_{max\ barrier} - U_{barrier\ empty}}(U_{barrier} - U_{barrier\ empty}) - 0,$$

$$5 L_{barrier}$$

On the other hand, once the set point for the height has been calculated using the various strategies, i.e. the height $h_{absolute\ implements}$ at which the implements must be at the moment when the plant to be cut is located at the level of the implements, it is necessary to know the set point which corresponds in terms of the extension of the cylinder $x_{extension}$ For this, thanks to the relationship (7) the angle $\theta$ required to obtain the desired height $h_{absolute\ implements}$ is calculated. Then the equation (4) makes it possible to deduce (11):

$$x_{extension} =$$
$$\sqrt{L_1^2 + L_3^2 + L_4^2 + H_2^2 + 2\sin\theta(L_1 L_3 - L_4 H_2) - 2\cos\theta(L_1 H_{2+} L_3 L_4)} - l_0$$

Moreover, care can be taken to limit the set point of extension between 0 and the course of the cylinder (300 mm for the cylinder used) in order to not obtain set points that are negative or greater than the maximum extension of the cylinder.

Finally, the voltage $U_{variator}$ is calculated, between $U_{min\ variator}$ and $U_{max\ variator}$ (between 0 and 10V for the variator used), to be sent to the variator thanks using the formula (12):

$$U_{variator} = \frac{U_{max\ variator} - U_{min\ variator}}{C_{cylinder}} x_{extension} + U_{min\ variator}$$

Details are provided hereinafter on the elaboration by the computer of the control set point for the height of the arm (determination of $h_{absolute\ implements}$ and through this of $U_{variator}$) on the basis of the measurements obtained by the height measuring sensor (measurement of $U_{barrier}$ in order to raise to $h_{absolute\ corn}$).

The objective of cutting with blades is to clear the view on the row by cutting just enough leaves and panicles so that the latter can still grow again afterwards. The cut therefore has to be relative homogeneous, without creating too many irregularities. The ideal cutting height of the panicle is located at three-quarters of the panicle. This supposes detecting the height of the base and of the top of the panicle in order to locate the three-quarters, which is difficult to reproduce with sensors, particularly given that the panicle can be hidden within the cone. Moreover, imposing a cutting height at a certain number of centimeters below the top of the stalk is not suitable because the panicle can also be close to this top as well as much lower. It is therefore necessary to obtain a relative measurement, adapted to each stalk of corn and to different plant architectures (upright carriage, drooping leaves, etc.).

During the tearing, it is necessary to remove all of the panicles that have grown again. As the panicles grow faster than the leaves, the objective is that the height of the leaves remains relatively homogeneous so that the panicles extend beyond. For this, abrupt variation in height must be limited during the cutting so as to be able to follow these variations afterwards during the tearing. For the tearing, it is necessary to place the rollers or the tyres as close as possible to the canopy of the leaves in order to tear the panicles that extend beyond without removing too many leaves.

Several strategies can therefore be considered according to their pertinence for the cutting or tearing. Each strategy can be based on the fact that the time elapsed between two data acquisitions of the height measuring sensor is converted into distance travelled using the speed that is calculated at each instant. As the light screen is located upstream of the implement or implements, the set point to be sent to the actuator at an instant t is not calculated using the sensor data at this same instant t but using prior sensor data. As such, the sensor data is memorised as it arrives then the set point is calculated using a small sample of acquisitions, with the first acquisition located at a distance $d_{Offset}$ from the current acquisition. The set point is then calculated using acquisitions includes over a distance $d_{Samp}$ and which correspond to the acquisitions of the plants that are currently on the implements.

Figure 3:
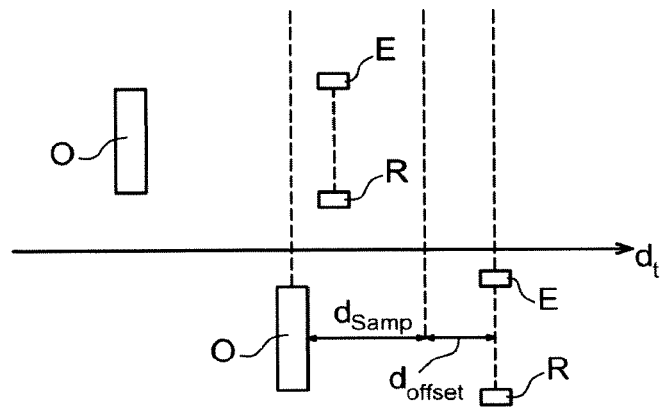
FIG. 3 is a diagram showing the sampling of data of the measurement sensor during the displacement of a vehicle equipped with the arm and the subsequent use thereof in order to determine the control set point for the height of the agricultural implement.

FIG. 3 shows these two distances. In this figure, the implement O and the sensor E are shown at the top, R at an instant t, and at the bottom the implement O and the sensor E, R at a later instant with a displacement according to the direction of travel Dt of the vehicle. The set point sent at the later instant is calculated using prior data acquisitions of the sensor taken when the sensor was scanning the distance $d_{Samp}$. As such, the system according to the invention can furthermore include a memory in which the measurements made by the height measuring sensor are recorded, and the calculator can be configured to provide the control set point for the height of the arm based on measurements previously recorded in the memory and corresponding to the prior displacement of the height measuring sensor over a predetermined distance $d_{Ech}$ of the direction of travel Dt upstream of the current position of the cutting implement. This predetermined distance $d_{Samp}$ is at most equal to the distance that separates the implement O from the height measuring sensor E, R.

In the framework of this embodiment, it is important to precisely know the speed of displacement at each instant of sampling in order to work not in elapsed time but in distance travelled. To do this, the system can include a measurement sensor of the forward speed in the direction of travel of the vehicle, and the calculator is then configured to determine the distance travelled along the direction of travel between two measurements taken successively by the height measuring sensor. In other terms, it is possible to timestamp the samples in memory with the instantaneous speed, in order then to make it possible to determine, at the time the set point for the height is calculated, which samples are corresponding to the prior displacement of the height measuring sensor over the predetermined distance $d_{Samp}$ (more or less samples according to whether the displacement is fast or slow).

The measurement sensor of the forward speed can an inductive proximity sensor associated with a plastic wheel fixed in the rim of a wheel of the vehicle and on the perimeter of which metal pins are arranged. At each pass in front of a metal pin, the output signal of the sensor is modified. As such, the forward speed can be deduced by calculating the time elapsed between two leading edges of the output signal, i.e. between two metal pins, knowing the length of the cord between these two points.

For each acquisition, the maximum absolute height of the corn $h_{absolute\ corn}$ is memorised. Then the set point for the height $h_{absolute\ implements}$ at which the implements have to cut the plant is calculated.

This calculation can be carried out in different ways according to the chosen strategy.

In an embodiment, the computer is configured to provide the control set point for the height of the arm using the average of the measurements taken previously by the height measuring sensor over said predetermined distance $d_{Samp}$.

This embodiment corresponds to a so-called "average" strategy according to which for the acquisitions of $d_{Samp}$, the average height of the corn is calculated. The set point sent $h_{absolute\ implements}$ is then equal to this average height at which a height $h_{Offset}$ can be subtracted which depends on the variety cut. This strategy has the advantage of encompassing the empty space between two stalks. It is intended to be used for cutting with blades.

In another embodiment, the computer is configured to provide the control set point for the height of the arm using the maxima of the measurement taken previously by the height measuring sensor over said predetermined distance $d_{Samp}$.

This embodiment corresponds to a so-called "maximum" strategy according to which for the acquisitions of $d_{Samp}$, the maximum height is detected among the heights of corn on this sample. The set point sent $h_{absolute\ implements}$ is then equal to this maximum height at which a height $h_{Offset}$ can be subtracted which depends on the variety cut. This strategy is rather intended for the tearing with rollers. It was verified that panicles that measure about 10 mm in diameter cannot be detected by the light screen, only the leaves are detected by designing a relative straight profile following the cutting with blades. The objective here is therefore to place the rollers just at the top of this profile, knowing that everything that extends beyond can only be the panicle and will therefore be torn.

In yet another embodiment, the computer is configured to calculate a foliage density that indicates, for each height interval of a set of successive intervals, the percentage of the measurements among the measurements taken previously by the height measuring sensor over said predetermined distance $d_{Samp}$ which indicate a height greater than the lower limit of the height interval, and to provide the control set point for the height of the arm on the basis of the lower limit of the interval of height corresponding to a threshold percentage.

Figure 4:
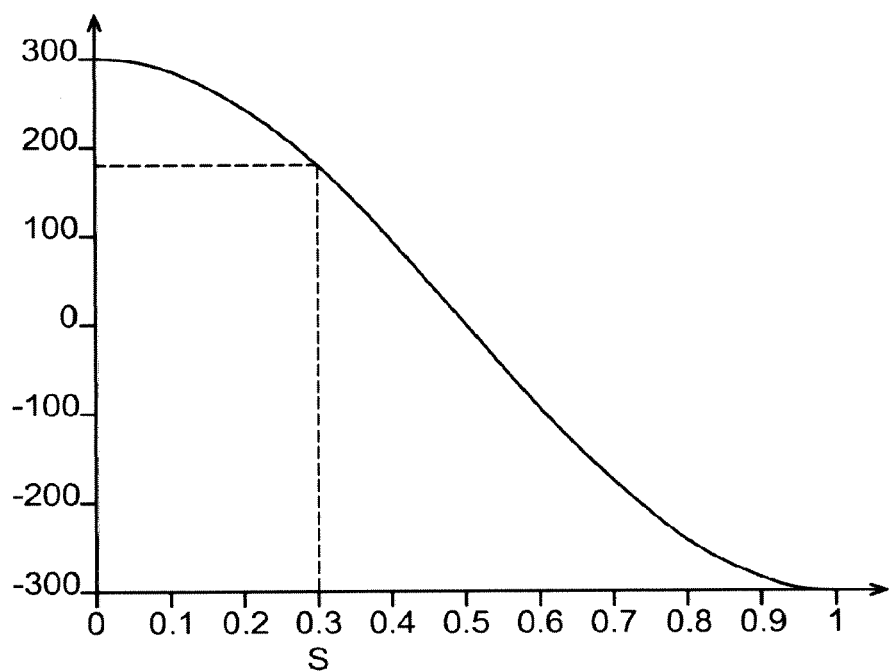
FIG. 4 is a diagram showing a foliage density that can be determined in a possible embodiment possible of the invention.

This embodiment corresponds to a so-called "foliage density" strategy according to which for the acquisitions of $d_{Samp}$, the minimum height among the heights of corn on this sample is identified. Then a loop is created that defines a current height equal to the minimum height incremented by 5 mm for example at each round of the loop and the percentage of acquisitions which correspond to a height greater than this new current height is calculated. As such, for the minimum height of the sample, 100% of the acquisitions of the sample have a height greater than the minimum height. Then as the current height increases, fewer and fewer acquisitions have a height greater than the current height. This percentage corresponds to what is called a foliage density. FIG. 4 shows an example of foliage density that can be determined in this embodiment. Plotted in ordinate is the height of the plants $h_{relative\ corn}$ and in abscissa the percentage of plants with a height greater than this height $h_{relative\ corn}$. A threshold S is defined starting from which it is deemed that the foliage density is sufficiently low (30% in the example of FIG. 4) in order to correspond to the optimum cutting height: indeed, the closer you approach the top of the plant, the more the foliage density is assumed to decrease. Note that reciprocally the foliage density can be estimated by starting at the maximum height and by checking the percentage of acquisitions that have a lower height.

The set point sent $h_{absolute\ implements}$ is then equal to the current height corresponding to this threshold S (around +175 mm in the example of FIG. 4), at which a height $h_{Offset}$ can be subtracted which depends on the variety cut. This strategy is intended to be used for cutting with blades. It further approaches the ideal measurement for three-quarters of panicles: indeed, it is imagined that at this ideal height there is no more than a certain percentage of leaves. In addition, it takes the architecture of the plant into account: for a variety with drooping leaves, there will be more leaves around the panicle that for a variety with upright carriage.

The invention is not limited to the system such as described hereinabove but also extends to a vehicle, in particular a high-clearance tractor, equipped with one or several systems according to the invention. It also extends to a method for adjusting the height of an agricultural implement by means of a system comprising an arm that can be controlled so as to raise and lower the agricultural implement, comprising the steps of:

acquiring measurements from a height measuring sensor mounted on the arm and positioned in front of the agricultural implement in a direction of travel of a vehicle intended to be equipped with the arm, the height measuring sensor being a light screen device formed by an emitter in the form of a column of light sources and a receiver in the form of a column of photoreceptors, the emitter and the receiver being mounted on the arm facing one another and extending along their longitudinal axis, perpendicularly to the ground in order to make it possible to measure the height of plants located therebetween; and determining a control set point for the height of the arm on the basis of the measurements acquired.

The invention as such provides a gain in precision by determining a set point for the height that is qualified, precise and adapted to each stalk of corn thanks to the development of calculation algorithms suited to the stakes of the cutting and of the tearing.

In addition, the invention also provides a gain in productivity since the system can be reproduced on several arms in order to cut or tear several rows simultaneously, independently of one another.

Finally, this system makes it possible to reduce the arduousness of the work of the farmer who no longer has to constantly watch the corn heights and adjust the height of the implements.

As such, this system improves the profitability of the mechanical cutting operations and reduces the number of panicles remaining to be uprooted by hand.

The invention claimed is:

1. A system for adjusting a height of an agricultural implement, comprising:
    an arm that can be controlled so as to raise and lower the agricultural implement,
    a height measuring sensor mounted on the arm and positioned in front of the agricultural implement in a direction of travel of a vehicle intended to be equipped with the arm, and
    a calculator configured to provide a control set point for the height of the arm on the basis of measurements obtained by the height measuring sensor,
wherein the height measuring sensor is a light screen device having a column of light sources and a column of photoreceptors, the column of light sources and the column of photoreceptors being mounted on the arm facing one another and extending along their longitudinal axis, perpendicularly to the ground in order to make it possible to measure a height of plants located therebetween.

2. The system according to claim 1, wherein the height measuring sensor is configured to carry out a straight sweep according to which all beams from a light source of the column of light sources to a photoreceptor of the column of photoreceptors are scanned in turn from the beam that is closest to the ground and in order to provide an indication relative to a last blocked beam.

3. The system according to claim 1, further comprising a memory in which the measurements made by the height measuring sensor are recorded, the calculator being further configured to provide the control set point for the height of the arm based on measurements previously recorded in the memory and corresponding to a prior displacement of the height measuring sensor over a predetermined distance of the direction of travel upstream of a current position of the agricultural implement.

4. The system according to claim 3, further comprising a speed sensor configured to measure a forward speed in the direction of travel of the vehicle, and wherein the calculator is furthermore configured to determine a distance travelled along the direction of travel between two measurements taken successively by the height measuring sensor.

5. The system according to claim 3, wherein the calculator is configured to provide the control set point for the height of the arm using an average of measurements previously made by the height measuring sensor over said predetermined distance.

6. The system according to claim 3, wherein the calculator is configured to provide the control set point for the height of the arm using a maxima of measurements made by the height measuring sensor over said predetermined distance.

7. The system according to claim 3, wherein the calculator is configured to calculate a foliage density that indicates, for each height interval of a set of successive intervals, a percentage of measurements among the measurements previously made by the height measuring sensor over said predetermined distance which indicate a height greater than a lower limit of the height interval, and to provide the control set point for the height of the arm on the basis of the lower limit of a height interval corresponding to a threshold percentage.

8. The system according to claim 1, wherein the arm comprises two posts connected so as to pivot and a cylinder mounted between the posts so as to raise and lower the agricultural implement by pivoting of one of the posts of the arm with respect to the other of the posts of the arm.

9. The system according to claim 1, wherein the agricultural implement is an implement for cutting or tearing plants.

10. A vehicle equipped with a system according to claim 1.

11. A method for adjusting a height of an agricultural implement by means of a system comprising an arm that can be controlled so as to raise and lower the agricultural implement, comprising the steps of:
- acquiring measurements from a height measuring sensor mounted on the arm and positioned in front of the agricultural implement in a direction of travel of a vehicle intended to be equipped with the arm, the height measuring sensor being a light screen device having a column of light sources and a column of photoreceptors, the column of light sources and the column of photoreceptors facing one another and extending along their longitudinal axis, perpendicularly to the ground in order to make it possible to measure a height of plants located therebetween; and
- determining a control set point for the height of the arm on the basis of the acquired measurements.

\* \* \* \* \*